United States Patent Office 3,236,655
Patented Feb. 22, 1966

3,236,655
PRODUCTION OF POLISHED JUICES
Andrew F. Murch and John A. Murch,
R.R. 3, Paw Paw, Mich.
No Drawing. Filed Jan. 28, 1963, Ser. No. 254,474
20 Claims. (Cl. 99—106)

The present invention relates to the production of edible fruit and vegetable juices, that is, such juices which are utilizable as food, and is more particularly concerned with a novel method for the production of polished edible juices from the whole edible produce, i.e., edible fruits or vegetables, by a greatly simplified process which obviates the necessity of pressing and/or centrifuging and a plurality of solids separation steps, all of which have been essential according to previous practice.

It is well established in the juice industry that certain edible fruit and vegetable juices, for example, pineapple, tomato, citrus juices, and the like, are presently marketed as cloudy juices, that is, juices which contain considerable insoluble, undissolved, or suspended solids, due to consumer taste and preference. On the other hand, edible juices such as grape, apple, cherry, and the like, are normally marketed as clear, sparkling juices, that is, juices substantially free from insoluble solids. The latter type of clear and sparkling juice is referred to as a "polished" juice. In order to prepare polished juices, it is necessary to remove substantially all solids, such as fruit pulp, skin, and seeds, which are not soluble in the juice and which would therefore give rise to a cloudy appearance or otherwise detract from its clarity and brightness. The difficulty of removing substantially all insoluble solids by previously available procedures has been a major factor in the practice of the industry to market certain juices in the cloudy, rather than in the polished, state.

Several methods have been devised, and numerous methods have been proposed, for the production of polished juices. In present commercial methods, the whole fruit or vegetable is first comminuted into discrete pieces and pressed in a press or centrifuged, separating the juice from solid portions of the fruit. Several types of presses have been employed for this purpose, primarily of the hydraulic or screw types. When using a hydraulic type of press, the fruit or vegetable, usually already comminuted, is placed between filter cloths in a filter rack and subjected to high pressures. The juice escapes through the cloth, leaving the pulp behind. For economic reasons, most of the industry in recent years has turned to the continuously operating and more sanitary screw type presses, or to Wilmess-type air-actuated squeeze-type presses, or the like. Although these latter type presses are economically advantageous, they still require considerable labor to operate and clean. Moreover, regardless of the type of press employed, the juice obtained from the pressing step still contains excessive insoluble solids, at least about one and often as high as ten percent, and therefore requires at least one further filtration step before it can be considered a "polished" juice. In an alternate procedure, a substantial part of the juice may be extracted from the comminuted fruit or vegetable by centrifugation, and the wet residual pulp then pressed to recover the considerable remaining juice and render the process economic. The combined juices then require a further filtration to produce a polished juice. In many cases, when a polished juice, e.g., grape juice, is to be produced commercially, a long period of standing in huge settling tanks, e.g., for up to about three months, is required to allow insoluble solids to settle prior to the filtration. Although many variations and improvements have been made in these general methods, all require at least two separate steps in which the juice is separated from insoluble solids, whether by pressing, centrifugation, filtration, or some other technique. Moreover, all previous commercial methods require pressing and/or centrifugation, followed by a further filtration or equivalent step for separation of insoluble solids. It is evident that a process for the production of polished juices whereby the juice may be separated from insoluble solids in a single step, and which preferably obviates employment of a press and/or centrifuge and elaborate settling equipment, would be highly desirable and would represent a considerable advance in the art.

It is accordingly an object of the present invention to provide a method for the production of polished juices wherein the juice is separated from insoluble solids in a single step. An additional object is the provision of a method for the production of polished juices from the whole fruit or vegetable which obviates the necessity of a press and/or centrifuge and makes the previous duplication of solids separation equipment unnecessary. Another object is to provide a more economical method for the preparation of polished fruit and vegetable juices by virtue of an increased yield of the polished juice or juice concentrate. A further object is the provision of a process which allows attainment of the ultimate goal of the juice industry, namely, production of a juice with maximum flavor, color, clarity and yield. A still further object is the provision of a process for the production of an edible fruit or vegetable juice which includes the step of stripping volatile flavor at one stage and returning at least a part of the same to the juice at a later stage, in which the volatile flavor is stripped prior to filtration and returned to the juice after filtration and preferably after a concentration step, which process is productive of volatile flavor far in excess of that amount previously recovered from any prior juice production process so that only approximately two-thirds of the recovered volatile flavor stripped need be returned to the juice in order to provide an acceptably flavored product, the remainder of the volatile flavor being suitable for sale as such in normal commercial channels. Additional objects will be apparent to one skilled in the art and still other objects will become apparent hereinafter.

The foregoing and additional objects are accomplished by provision of the method of the present invention. It has now been found that polished juices can be obtained from the whole fruit or vegetable by a greatly simplified process, and moreover in higher yields than formerly obtainable using conventional methods. In addition, the method of the invention obviates the use of expensive labor and time-consuming presses and/or centrifuges, and makes double solids separation and settling tanks entirely unnecessary. According to the invention the whole fruit or vegetable is pulverized into a fine pulverulent fluid mass comprising both solids and juice, treated with a depectinizing enzyme to deceptinize the mass, the depectinizing enzyme inactivated, a filter aid added to the pulverulent mass, and the fluid mass then filtered to yield the final polished juice in a single solids separation step, without the use of a press and without the need of further filtration. Because the method is continuous, gives increased yields of polished juice or juice concentrate, and obviates the use of labor and time-consuming presses, centrifuges, and two separate separations of insoluble solids, it is considerably more economical than conventional methods which do not have these advantages. It is moreover a cleaner, more efficient process. In addition, the equipment which is no longer required and which may accordingly be dispensed with represents a considerable decrease in required capital outlay, which may in a single installation amount to a saving of $50,000 or even more.

The process of the present invention, in its broadest sense, essentially comprises the following steps:

(1) Pulverizing the whole produce, i.e., fruit or vegetable, into a fine pulverulent fluid mass, comprising both solids and juice (see Note 1 following).

(2) depectinizing with a pectic enzyme, (3) inactivating the depectinizing enzyme, (4) adding a filter aid to the pulverulent mass, and (5) without prior separation of the insoluble solids from the juice, filtering the pulverulent fluid mass on a fine mesh sheet material precoated with filter aid to extract the juice from the mass substantially free of insoluble solids and yield a polished juice.

Numerous variations in the process are possible, as for example set forth hereinafter under adaptations I through VI and as shown by the examples. Moreover, steps 2 and 3 may be omitted in those rather unusual cases where pectin is not present in the produce.

According to the invention, the washed whole produce, preferably minus seeds and stems, but including skin, is pulverized to a fine pulverulent fluid mass in any suitable or convenient manner. This may be accomplished by crushing, cutting, or grinding and pulping the produce through a food pulper. The produce may be heated and then pulped or comminuted, heated and/or depectinized and then pulped. Many other suitable methods for pulping or pulverizing are known in the art and may be employed with equal facility, although they have not previously been employed in a process for the production of polished juice. The fine pulverulent fluid mass, of the consistency of a fine puree, with considerable liquid and much mud-like sediment, is then heated to a depectinizing temperature, normally about 120 to 150, usually about 140, degrees Fahrenheit, although conditions will vary somewhat with the enzyme composition used for depectinizing and the specific fruit treated, and maintained at the depectinizing temperature until depectinization is substantially complete, normally about an hour. Pertic enzymes are presently available which are efficiently active within temperture ranges of about 100 to about 165 degrees Fahrenheit In the case of heat-sensitive fruits such as apples, it may be desirable to use temperatures as low as sixty degrees Fahrenheit, although the efficiency of the pectic enzymes usually decreases with decreasing temperatures, for which reason longer periods of treatment will normally be necessary to effect depectinization at lower temperatures, when employed. A considerable number of suitable enzyme depectinizing agents are known in the art and commercially available, such as the Pectinols (Pectinol A, Pectinol 5–B, Pectinol RA–5; Rohm and Haas Company), the Klearzymes (Klearzyme 200 and Klearzyme 50; Wallerstein Company), and the Takamine Pectinases (e.g., Pectinase–LM; Miles Chemical Company). Numerous others are known and may be used if desired. The optimum temperature and other conditions for depectinizing with the individual depectinizing agents is well known and documented in the prior art.

The depectinizing enzymes break down the pectin naturally occurring in the fruit or vegetable, impede the gelling action of the pectin, release juices from the pulp, and prevent flocculation and clogging of the filter media with colloidal and other solids which would interfere with the free flow of juice through the filter media. When depectinization is complete, the pulverulent fluid mass may be heated, e.g., pasteurized, to inactivate the enzyme. Such inactivation is usually accomplished by heating the mass containing the enzyme to an elevated temperature, e.g., about 175 to 190, usually about 180, degrees Fahrenheit, for a period of about one to three minutes. If desired, higher temperatures may be and often are used for so-called "flash pasteurization." Other methods for inactivation may be used if desired. Inactivation of the pectic enzyme in the pulverulent fluid mass may sometimes be delayed until after the filtration step with little or no detrimental effect upon the final polished juice, provided it is effected promptly after the filtration, but such delay is not recommended.

In order to attain a reasonable rate and efficiency of filtration, a quantity of filter aid is added to the pulverulent mass prior to filtration. Normally about 25 to 100 pounds of filter aid per ton of pulverulent fluid mass to be processed is adequate, with about 50 pounds of filter aid per ton giving excellent results. The filter aid may be mixed with the pulverulent fluid mass at almost any convenient time prior to the actual filtration, such as before, during or after the depectinization, or immediately before, during, or after introduction of the pulverulent fluid mass into a filter sump.

The pulverulent fluid mass containing added filter aid is then subjected to filtration on a fine mesh sheet material which has been precoated with filter aid. This is most conveniently accomplished on a pressure or vacuum filter, advantageously of the rotary drum type, and preferably on a so-called rotary vacuum precoat filter. The fine mesh sheet material filter with its filter aid surface is prepared by disposing or precoating on a support screen, cloth, web, or decking from about one to five inches of a filter aid. The filter cake on the sheet material may be of greater thickness, depending upon clearance available for the cake in the particular filter installation employed.

The sheet material (e.g., screen, web, cloth, or decking) used to support the filter aid cake during the filtration may be of any suitable type, so long as it is characterized by a mesh sufficiently fine to support the filter aid. The fine mesh sheet material may accordingly be of stainless steel, cloth, or the like, and is preferably a monofilament cloth or decking of natural or synthetic fiber threads. Stainless steel screens and cloths or deckings of linen, cotton, Orlon, nylon, polyethylene, polypropylene, polyvinyl chloride-polyvinylidene chloride or other Sarans, and other plastics have all been used as the filter aid support material with good results.

As representative of suitably fine mesh, cloths or deckings having from about 100–175 by 30–125 threads per inch have been used successfully. Nylon cloth of 157 x 108 threads per inch, polypropylene cloth of 116 x 34 threads per inch, polyethylene cloth of 105 x 40 threads per inch, and Saran cloth of 123 x 53 threads per inch, the respective weights being 7.0, 6.15, 9, and 11.08 ounces per square yard, have all been found suitable although, as previously stated, it is only necessary that the filter aid support material be a sheet material of a mesh sufficiently fine to support the filter aid which is to be precoated thereon in the form of a cake and of course not so fine as to preclude passage of the juice through the interstices thereof.

Many suitable filter aids are commercially available, with filter aids of the diatome-containing type, e.g., marine diatomes, fresh water diatomes, or diatomaceous earth or silica, and perlite (volcanic rock) types giving outstanding results and therefore being preferred. Dicalite (Great Lakes Carbon Corporation), Celatom (Eagle-Pitcher), Sil Flo (Sil Flo Corporation), Celite (Johns-Manville) and numerous other filter aids of the diatomaceous and other types are suitable.

The size of the particles of the filter aid used in the process of the invention may vary widely. Filter aids having a mean particle size as measured on their longest particle diameter of about 2 to 25 microns have been satisfactorily employed. Those having a mean particle size of about 4 to 11 microns are preferred for most purposes and for most produce treated. The optimum particle size of the filter aid will actually vary somewhat depending upon the fruit or vegetable being treated. In general, the more difficult the separation of the insoluble solids from the juice, the smaller should be the particle size of the filter aid employed. For example, in the treatment of apples, a filter aid particle size of about 4.5 to 5.6 microns is preferred, whereas with grapes the particle size is ordinarily about 5.6 to 11 microns and is preferably about 8.4 microns.

In usual operation, the fine pulverulent fluid mass is fed into contact with the filter aid precoated on the support screen or decking and a pressure or vacuum of about 15 to 25 inches of mercury applied. If pressure, it will be applied to the fluid mass on the coated surface and, if vacuum, it will be applied on the reverse or supported surface of the precoat. Ordinarily, the vacuum or pressure will vary with the thickness of the filter cake. With a five-inch starting cake on a rotary drum vacuum filter, for example, the vacuum may vary from 28 down to 8 or 9 inches of mercury pressure as the thickness of the cake decreases. A 20-inch initial vacuum is usually sufficient and an initial vacuum of 23 inches of mercury is not uncommon.

The juice is forced through the filter by the difference in pressure on its two surfaces and collected, while the sludge and insoluble solids are trapped on the surface of the precoat. The precoated filter aid layer is preferably gradually shaved or reduced in thickness by means of a scraper, knife, or other suitable instrument in order to expose fresh filter aid surface and accelerate the filtering process. The mat and residual pulp and insolubles are preferably washed periodically or continuously, as by means of a leaching bar, to aid in the extraction of the juice and minimize loss of juice. The same considerations apply with vacuum and pressure filters of the precoat type except that the pressure is applied to the opposite side of the precoated decking, e.g., to the fluid mass outside of the drum whereas a vacuum is applied to the inside. Suitable filters of the pressure and vacuum type are available under the Eimco, Dorr-Oliver, and Komline-Sanderson tradenames, as well as numerous others.

As mentioned, a particularly convenient and efficient type of filter is a rotary vacuum precoat filter in which the precoat is disposed on the decking on the outer surface of a filter drum which is rotated in a sump containing the fine pulverulent fluid mass to be filtered. A vacuum is applied on the inner surface of the drum and the juice is forced by atmospheric pressure through the precoat and decking into the drum and collected, while the insolubles and solids remain on the surface of the drum and in the sump. The precoat surface can be shaved by means of a knife or scraper on an advance mechanism which slowly advances as the drum rotates, and the pulp caught on the drum can be washed with a leaching bar or similar apparatus to minimize loss of juice. In actual semi-continuous operation, using a rotary vacuum filter having a drum, the decking on which was initially precoated with a three-inch to five-inch layer of filter aid, depending upon the exact filter aid employed, it has been found that the operation may be conducted for periods up to 48 hours without replacing the original filter aid layer and that, during such 48-hour period, it is possible to produce up to 200,000 gallons of polished juice without interruption. After such a run is complete, the remaining filter aid coating is removed and the decking re-precoated with filter aid, whereupon the sequence may be repeated until the entire pack of produce is converted to polished juice.

If desired, the volatile flavor of the fruit or vegetable may be stripped prior to filtration, and reblended with the juice after filtration and especially after a concentration step, if employed, in order to provide optimum flavor in the finished juice. Flavor stripping results in concentration or partial concentration of the fine pulverulent fluid mass. This may also be effected in other ways, as by evaporation, or the produce may be processed in unconcentrated and unstripped condition throughout.

To provide optimum flavor in the final juice product, however, it is advantageous to strip the volatile flavor from the fine pulverulent fluid mass prior to filtration, and reblend it with the juice after filtration and especially after any concentration. As indicated hereinafter, in the case of certain types of produce, e.g., apples, the flavor may be stripped from the comminuted produce, as produced by a hammermill or Fitzmill, especially since the higher temperatures used in stripping and in preheating for stripping tend to reduce the particle size of the pulp of such produce, which may be subsequently pulverized or further pulverized for the filtration step in the event the previous treatment was not sufficient. Numerous methods for voltaile flavor stripping are known. Probably the most convenient method for volatile flavor stripping is to fractionally distill the fluid part of the finely comminuted produce or fine pulverulent fluid mass prior to filtration and isolate and collect the volatile flavor. The non-volatile flavor remains in the pulverulent fluid mass. For example, the fluid mass can be heated, the vapors introduced into a fractionating column, and the fraction or fractions containing the volatile flavor isolated and collected. After filtration the juice can be concentrated and the isolated flavor returned and blended therewith. When flavor stripping is employed, the final edible juice product has an enhanced natural flavoring. In addition, only approximately two-thirds of the flavor stripped need be returned to the edible juice in order to produce a satisfactory and marketable juice product having an acceptable flavor. However, the method of the invention can be successfully employed either with or without flavor stripping.

Several existing processes, presently in commercial use, for the production of polished juices, e.g., grape juice, may be schematically outlined as follows:

(A) Present typical single-strength operation:
   (1) Wash produce.
   (2) Grind into discrete pieces, (Note 1).
   (3) Heat to ca. 140° F. for depectinizing.
   (4) Depectinize for about one hour.
   (5) Add paper as pressing aid.
   (6) Press in screw type machine.
   (7) Rough filter.
   (8) Heat to ca. 190° F. to inactive pectic enzyme.
   (9) Chill to 30° F. as by heat exchanger.
   (10) Store in bulk tanks under refrigeration cooling until to be used (some settling occurs at this stage; essential for juices like grape).
   (11) Polish filter when removed from cooler storage.

(B) Present typical concentrate operation:
   (1–5) Same as above.
   (6) Press in screw type or Wilmess (air-actuated squeeze type) press.
   (7) Strip off flavor from juice (by essence recovery unit).
   (8) Flter on vacuum, leaf, or plate and frame pressure filter to polish juice.
   (9) Leach filter.
   (10) Concentrate juice.
   (11) Cool concentrate.
   (12) Return essence from Step 7 to concentrate.

The process of the invention may be adapted to numerous fruits and vegetables and as the entire or only a part of the complete operation. The following are representative embodiments and adaptations thereof, it being understood that the temperatures may be varied widely, depending upon the type of produce being extracted.

(I)

(1) Wash produce.
(2) Grind or destem into discrete pieces, (Note 1).
(3) Heat pulp to 100–150° F. for depectinizing.
(4) Depectinize by adding pectic enzyme and holding at elevated temperature, e.g., 100–150° F., for one-half to two hours, (Note 2).

(5) Pulverize into a fine pulverulent fluid mass in a machine such as a pulper which also removes seeds, (Note 3).

(6) Heat to 170–190° F. for from one to three minutes to inactivate pectic enzyme.

(7) Filter pulverulent mass on precoated filter, preferably vacuum, using added filter aid, e.g., 10 to 100 pounds per 200 gallon input.

(8) Cool filtered juice to desired temperature for further processing, e.g., canning or freezing, and then packaging, (Note 4).

(II)

(1–5) Same as in I.
(6) Step 7 from I.
(7) Step 6 from I; juice then ready for canning, (Note 4).

(III)

(1–2) Same as in I.
(3) Heat to 100–200° F. prior to pulverizing in order to obtain more efficient pulverization.
(4) Pulverize into a fine fluid pulverulent mass in a machine such as a pulper which also removes seeds, (Note 3).
(5) Strip off flavor from pulverulent mass (by essence recovery unit).
(6) Cool, as by heat exchanger or flashing into a vacuum, to 100–150° F.
(7) Depectinize by adding pectic enzyme and maintaining elevated temperature, e.g., 100–150° F., for one-half to two hours, (Note 2).
(8) Heat to 170–190° F. for from one to three minutes to inactivate pectic enzyme.
(9) Filter juice on precoated filter, preferably vacuum, using added filter aid, 10 to 100 pounds per 200 gallon input.
(10) Leach residue on filter to obtain maximum yield of juice.
(11) Concentrate juice to desired concentration, as in evaporator.
(12) Cool concentrate to 60° F. or below to preserve flavor and color.
(13) Return essence from Step 5 to concentrate. (Optional—can be kept separate and added back later.)

(IV)

(1–2) Same as in III.
(3–12) Steps 4–13 of III.

(V)

(1–2) Same as in III.
(3–4) Steps 5 and 6 of III.
(5) Step 4 of III.
(6–12) Steps 7–13 of III.

(VI)

(1–2) Same as III.
(3 and 4) Same as in II.
(5 and 6) (or reverse): Steps 4 and 5 from III.
(7–14) Same as 6–13 of III.

*Note 1.*—In the present process, fruits such as grapes require destemming. Fruits such as apples do not. Stems are normally removed because they contain a bitter flavor. Considerable grinding is involved in the removal of stems, where necessary or desirable. When a press is to be employed, according to prior art practice, it is still essential and common practice to remove stems from fruits such as grapes or the like. Seeds and pits are not ordinarily removed in prior art practice, since the step of pressing or centrifuging effects such removal and flavor or essence stripping is effected from the juice after separation of insoluble solids, as by a press. In the present process, flavor stripping is before separation of insoluble solids.

*Note 2.*—The object of depectinizing is to inactivate the pectin present in the fruit. Temperature, amount and type of enzyme used determine the exact time required for depectinization.

*Note 3.*—Machines other than pulpers or finishers exist which will pulverize produce, such as disintegrators. However, in the case of most fruits, e.g., grapes or cherries, it is desirable to remove seeds or pits since they usually contain objectionable flavors. Pulpers or finishers remove seeds and at the same time pulverize, whereas most other machines also pulverize the seeds and pits. Hence pulpers (i.e., finishers) are preferred.

*Note 4.*—These two variations pertain to the production of single strength juice. Even though essence recovery and concentration are advantageous, the process can be utilized for a single strength juice operation.

The following examples are given by way of illustration only and are not to be construed as limiting.

*Example 1: Apples—Production of polished apple juice by new process*

A quantity of apples weighing 2,538 tons total weight was washed and pulverized to a fine slurry by running through a hammermill and then pulping the resulting pomace in a Food Machinery pulper. The finely pulverulent fluid mass was heated to 220 degrees Fahrenheit and thirty percent of the volume vaporized into steam and fractionated to isolate and collect the volatile flavor. The fluid mass, partially concentrated by this process, was cooled by vacuum to 140 degrees Fahrenheit and pumped into holding tanks where it was treated for a period of 45 minutes with a depectinizing enzyme (Klearzyme 200 or 50). At the end of this period the fluid mass was pasteurized at 180 degrees Fahrenheit for three minutes, and then recooled to 140 degrees Fahrenheit.

A 500-square foot rotary vacuum precoat filter (Eimco) equipped with a leaching bar at the top of the drum for continuously washing the surface of the drum while in operation was used to filter the fluid mass. The filter was prepared for filtering by building up, by means of a vacuum, a precoat of diatomaceous earth filter aid powder (Dicalite—Great Lakes Carbon Corporation) mixed with water to a suitable level, e.g., an approximately three-inch thickness. When a perlite filter aid powder is employed as filter aid, as disclosed hereinbefore and in Example 14, the precoat may be built up to an approximately five-inch thickness. After completion of the precoating operation the water was emptied from the sump surrounding the filter drum and the finely pulverulent fluid apple mass to be filtered then fed into the sump. In order to obtain a faster rate of flow, approximately fifty pounds of filter aid powder per ton of fruit processed was added to the fluid mass in the filter sump. An original vacuum of 23 inches of mercury was applied on the inner surface of the drum and the drum slowly rotated in the sump. The juice was forced through the filter cake by the difference in pressure on the two surfaces of the precoat layer, and collected from inside the drum. A knife on an advance mechanism was used to shave the full length of the surface of the rotating drum as it returned to the juice sump, thus continually exposing new filtering surfaces. The knife advanced at the rate of about .002 inch per revolution.

The filtered juice, already partially concentrated by the stripping, was then fed into an evaporator where it was concentrated to 70 Brix (i.e., 70% dissolved solids, mainly sugar). It was then cooled to 60 degrees Fahrenheit and the volatile flavor collected prior to filtration was returned and thoroughly blended. The filtration process was run continuously for 48-hour periods, during each of which periods approximately 175,000 gallons of polished juice were produced. At the end of each period, remaining filter aid was stripped from the decking of the rotary drum and replaced with a new layer of filter aid of approximately three- to five-inch thickness, depending upon the exact filter aid employed, and the operation continued until the entire pack of apples had been processed.

The final yield of polished apple juice was 484,186 gallons of single strength juice of 13 Brix, for a yield of 190.8 gallons of 13 Brix juice per ton of fruit processed, almost a twenty perecnt increase over the usual yield of approximately 160 gallons of 11.5 Brix (weaker) apple juice per ton of apples processed according to conventional procedure. The product was a clear sparkling liquid which contained less than .001% insoluble solids, which could not be measured with standard measuring equipment. The product moreover had an enhanced flavor of freshly produced apple juice.

This yield represented an approximately 22.8 gallons per ton increase (as well as an approximately 1.5% increase in soluble solids) over the yield realized from the previous year's pack, using what was then considered the best process available, as shown in Example 2. The total increase in gallonage of polished juice realized by the new process was 57,866.4 gallons.

Only approximately 65% of the essence previously stripped from the pulverulent mass was required to restore a completely satisfactory flavor to the apple juice produced from the process. The remainder was bottled and supplied to the trade as essence of apply juice, there being a considerable demand for the same.

*Example 2: Apples—Comparative—Old process*

A pack of apples weighing 235.5 tons total weight was treated in the manner of Example 1 with the exception that a Wilmess air-actuated squeeze-type press replaced the rotary vacuum filter and that the flavor was stripped from the juice after separation of insoluble solids from the juice on the Wilmess press and returned to the juice after a further filtration to remove insoluble solids and concentration. As usual when a press is employed, stems and seeds were not removed prior to pressing on the Wilmess press.

The product of this run was 39,561 gallons of single strength polished apple juice of 11.5 Brix (percent soluble solids) for a yield of 168.0 gallons of polished apple juice having 11.5% soluble solids (11.5 Brix) per ton.

It was necessary to employ all of the essence stripped from the juice after the pressing operation to produce a satisfactory and marketable product having an acceptable apple taste.

*Example 3: Grapes—New process*

In the manner of Example 1, a pack of 452.2 tons of Concord grapes was processed after removal of stems to give 89,581 gallons of polished single strength grape juice of 17 Brix, for a yield of 198.1 gallons per ton at 17 Brix. The pectic enzyme used was Pectinase-LM.

This yield represented an approximately 8.5 gallons per ton increase over the yield realized from an earlier pack of the same year, and an approximately 6.1 gallons per ton increase over the yield realized from the previous year's pack, in each case using what was then considered the best process available, as shown in Examples 4 and 5. The total increase in gallonage of polished juice realized by the new process was 3,843.7 gallons or 2,758.42 gallons, depending on the pack chosen for comparison.

In addition, this represented an increase of 2.2% in soluble solids over the previous year's pack, as shown in Example 5.

Only approximately 65% of the essence stripped from the pulverulent fluid mass was required to restore a completely satisfactory flavor to the grape juice after the concentration step. Accordingly, only 65% of the essence was returned to the juice at this point and the remainder was packaged and placed in trade channels as grape essence, for which there is a ready market.

*Example 4: Grapes—Comparative—Old process*

In the same manner as given in Example 2, after stem removal, a pack of 9,414.5 tons of Concord grapes was prcessed to give 1,785,476 gallons of polished single strength grape juice at 17 Brix, for a yield of 189.6 gallons per ton at 17 Brix.

It was necessary to return all of the essence, stripped from the juice after removal of insoluble solids, to the juice after filtration and concentration in order to produce a satisfactory and marketable product having an acceptable grape flavor.

The total pack of grapes processed in the year which produced the several packs reported in Examples 3 and 4, including both Niagara and concord grapes, was 12,230 tons. Of this total pack, only the quantity given in Example 3 was processed according to the new process. The total quantity of grapes not processed according to the new process during that year, since the new process was not yet available, was 11,778 tons. If the new process had been available for the processing of this quantity, assuming an increase of approximately 8.5 gallons of polished juice per ton, as already indicated in Example 3, the increase in gallonage of polished juice realized would have been approximately 100,113 gallons, having a dollar value of approximately $75,000.

Considering the total pack of grapes processed in the year which produced the several packs reported in Examples 3 and 4, the total quantity of grapes not processed according to the new process was approximately 12,000 tons (11,778). At approximately 200 (198.1) gallons of single-strength juice per ton by the new process, the total juice gallonage by the new process would have been 2,400,000 gallons of juice. At a yield of 1 gallon of essence per 150 gallons of juice, which is the normal experience upon flavor stripping (this being considered "150 fold grape essence"), this gallonage would have produced approximately 16,000 gallons of 150 fold grape essence. If only two-thirds of the essence were added back to give an acceptable flavor to the juice product, as already indicated in Example 3, the total amount of grape essence not added back would have been 5,333 gallons, having a dollar value of approximately $42,500 in normal commercial channels.

*Example 5: Grapes—Comparative—Old process*

In the manner of Example 2, after stem removal, a pack of 3,235.7 tons of grapes was processed to give 621,409 gallons of single strength grape juice at 14.8 Brix.

The yield was 192.0 gallons of juice per ton at 14.8 Brix.

In order to produce a marketable product having an acceptable grape flavor, it was necessary to return all of the essence, stripped from the juice after pressing, to the juice after the concentration step.

*Example 6: Crabapples—New process*

In the manner of Example 1, a pack of 349.7 tons of crabapples was processed to give 70,393 gallons of polished single strength crabapple juice at 15.5 Brix. The yield was 201.3 gallons of juice per ton at 15.5 Brix.

This represented an increase of approximately 49.3 gallons per ton over a previous year's pack using what was then considered the best available process, as shown in Example 7. The total increase in gallonage of polished juice realized by the new process was 17,240.2 gallons.

Only approximately 65% of the essence obtained by stripping was required to produce a completely satisfactory crabapple flavor in the juice. The remainder was packaged and introduced into commercial channels as crabapple essence, for which a ready market exists.

Example 7: Crabapples—Comparative—Old process

In the manner of Example 2, a pack of 669.4 tons of crabapples was processed to yield 101,713.3 gallons of polished single strength crabapple juice at 15.5 Brix. The yield was 152 gallons of juice per ton at 15.5 Brix.

It was necessary to return all of the essence stripped during the process to the juice in order to produce a marketable juict having a satisfactory crabapple flavor.

Example 8: Cherries—New process

Example 1 is repeated using freshly-picked Montmorency cherries as the fruit to be processed. In one pack, no pectin was detected and the depectinizing and pectic enzyme inactivation steps were accordingly omitted. The yield of polished cherry juice per ton of cherries is substantially higher than obtained according to the conventional procedure of Example 2. Once again, only about 65% of the essence stripped from the fluid mass prior to filtration need be returned to the juice after concentration to provide an acceptable product.

Example 9: Strawberries—New process

Strawberries are processed in the manner of Example 1. On a basis of a 500-square foot surface rotary vacuum filter, the capacity of the process is about 5,160 gallons of juice per hour. The yield of polished strawberry juice per ton of strawberries is substantially higher than obtained according to the conventional procedure of Example 2. As usual, only about 65% of the flavor stripped from the fluid mass prior to filtration must be returned to the juice after concentration to provide an acceptable flavored product.

Example 10: Onions—New process

In the same manner as given in Example 1, except that leaching of the filter cake is omitted, a pack of onions is processed to give a polished single-strength onion juice in substantially higher yields of juice per ton than attainable by methods previously employed. The essence stripped from the finely pulverulent liquid mass is approximately 1.5 times as strong in onion flavor as essence stripped from onion juice from which insoluble solids have previously been separated.

Example 11: Celery—New process

In the same manner as given in Example 1, except that leaching of the filter cake is omitted, a pack of celery is processed to give a polished single-strength celery juice in substantially higher yields of juice per ton than attainable by methods previously employed. The essence stripped from the finely pulverulent liquid mass is approximately 1.5 times as strong in celery flavor as essence stripped from celery juice from which insoluble solids have previously been separated.

Example 12: Carrots—New process

In the same manner as given in Example 1, except that leaching of the filter cake is omitted, a pack of carrots is procesed to give a polished single-strength carrot juice in substantially higher yields of juice per ton than attainable by methods previously employed. The essence stripped from the finely pulverulent liquid mass is approximately 1.5 times as strong in carrot flavor as essence stripped from carrot juice from which insoluble solids have been previously separated.

Example 13: Apples—New process

Apples are processed in the manner of Example 1. On a basis of a 500-square foot surface rotary vacuum filter, the capacity of the process is about 4,774 gallons of juice per hour.

Example 14: Apples—New process

In a further run according to Example 1, but employing a perlite filter aid instead of diatomaceous earth filter aid, the same advantageous results are realized. Employment of filter aids of marine diatomaceous nature gives the same result.

Example 15: Variations

In numerous additional runs with various fruits and vegetables in which variations according to adaptations I through VI as set forth in the foregoing are employed, the advantages of the present invention are uniformly realized.

The method of the invention can be advantageously and is preferably employed to produce polished juices from any fruit or vegetable from which polished juices are normally produced. Representative fruits and vegetables which are normally or which can be processed to give polished juices include grape, apple, crabapple, cherry, plum, pear, peach, apricot, strawberry, raspberry, blackberry, blueberry, cranberry, huckleberry, gooseberry, boysenberry, et cetera, and cabbage, lettuce, watermelon or other melon, cucumber, onion, turnip, radish, carrot, beet, celery, and the like. Because of its high efficiency, the process may even be applied to those fruits and vegetables which normally give cloudy juices and which accordingly are usually produced and/or marketed as cloudy juices, including tomato, avocado, asparagus, papaya, pineapple, citrus fruits such as orange, lemon, lime, grapefruit, tangerine, and tangelo, and numerous other fruits and vegetables whether of tree, bramble, or other origin, in each case to give a polished juice. As will be recognized, mixtures of such polished juices, as well as the individual juices and concentrates thereof, are in great demand, and the availability of the present process is not only of value in filling the existing demand but should also be of value in expanding the same due to an established consumer preference for polished as opposed to cloudy juices.

The process may also be applied in the production of fermented juices, e.g., wines, whether the fermentation is complete or partial and whether it is carried out prior to or after the filtration step, and is particularly valuable where a polished juice is required for a subsequent fermentation step or where an already fermented juice, e.g., wine, is to be subjected to normal "cellar treatment," although in those cases subsequent filtration may also be desirable prior to bottling. When the fermentation is carried out prior to the filtration, pectin is frequently not present in sufficient amounts after the fermentation so as to require depectinization before filtration according to the present invention.

Various modifications and equivalents will be apparent to one skilled in the art and may be made in the method of the present invention without departing from the spirit or scope thereof, and it is therefore to be understood that the invention is to be limited only by the scope of the appended claims.

We claim:

1. A simplified and novel method for producing polished edible juice substantially free of insoluble solids from an edible produce selected from the group consisting of edible fruits and edible vegetables, which novel method obviates the necessity of employing a press and allows increased yields of polished juice, comprising the steps of (a) pulverizing the produce into a fine pulverulent fluid mass comprising both solids and juice, (b) mixing a filter aid with the fine pulverulent fluid mass, and (c) filtering the said fine pulverulent fluid mass from step (b) on a fine mesh sheet material precoated with filter aid to extract the juice of the pulverulent fluid mass from the insoluble solids of the pulverulent mass, and (d) collecting the polished juice thus produced, the process also including, when pectin is present to an undesirable extent, the step of depectinizing the fine pulverulent fluid mass with a pectic enzyme and inactivating the pectic enzyme.

2. A process of claim 1, wherein step (c) is conducted by feeding the fluid mixture to the precoated surface, washing the surface of the filter aid coating, and shaving the surface of the filter aid coating to expose fresh filter aid surface.

3. A process of claim 1, wherein the filtration involves a procedure selected from (a) applying a vacuum to the filter surface opposite the precoated surface and (b) applying a pressure to the fluid mixture at the precoated filter surface.

4. A process of claim 1 wherein, when pectin is present, the process includes the steps of depectinizing with a pectic enzyme prior to step (b) and inactivating the enzyme.

5. A process of claim 1, wherein volatile flavor is stripped at a point in the process prior to the filtration step (c) and returned to the juice after the filtration step (c).

6. The process of claim 5, wherein a juice concentration step (e) is included in the process, and wherein volatile flavor is returned to the juice after said concentration step (e).

7. The process of claim 1, wherein the produce is a fruit.

8. The process of claim 7, wherein the fruit is apple.

9. The process of claim 7, wherein the fruit is crabapple.

10. The process of claim 7, wherein the fruit is grapes.

11. The process of claim 7, wherein the fruit is cherries.

12. The process of claim 1, wherein the produce is a vegetable.

13. The process of claim 12, wherein the vegetable is onion.

14. The process of claim 12, wherein the vegetable is celery.

15. The process of claim 12, wherein the vegetable is carrot.

16. A simplified and novel method for producing polished edible fruit juice substantially free of insoluble solids from the whole edible fruit by a process which includes the steps of depectinizing with a pectic enzyme and then inactivating the pectic enzyme, when pectin is present to an undesirable extent, which novel method obviates the necessity of employing a press and allows increased yields of polished juice having enhanced natural flavoring, comprising the steps of (a) pulverizing the fruit into a fine pulverulent fluid mass comprising both solids and juice, (b) stripping volatile flavor and, when pectin is present to an undesirable extent, depectinizing the fine pulverulent fluid mass with a pectic enzyme and inactivating the pectic enzyme by heating, (c) mixing a filter aid with the fine pulverulent fluid mass, and (d) filtering the fine pulverulent fluid mass from step (c) while at an elevated temperature on a fine mesh sheet material precoated with filter aid by feeding the fluid mixture to the precoated surface, applying a vacuum to the filter surface opposite the precoated surface, washing the surface of the filter aid coating, and shaving the surface of the filter aid coating to expose fresh filter aid surface, thereby to extract the juice of the pulverulent fluid mass from the insoluble solids of the pulverulent mass, (e) collecting the polished juice thus produced, (f) concentrating the juice, and (g) returning volatile flavor to the juice.

17. The process of claim 16, wherein the fruit treated is apple.

18. The process of claim 16, wherein the fruit treated is crabapple.

19. The process of claim 16, wherein the fruit treated is grapes.

20. The process of claim 16, wherein the fruit treated is cherries.

References Cited by the Examiner
UNITED STATES PATENTS

| | | | |
|---|---|---|---|
| 2,736,655 | 2/1956 | Gordon et al. | 99—105 X |
| 2,837,431 | 6/1958 | Wolcott | 99—106 |

A. LOUIS MONACELL, *Primary Examiner.*